United States Patent
Correia et al.

(10) Patent No.: US 10,917,035 B2
(45) Date of Patent: Feb. 9, 2021

(54) CONNECTORS FOR MODULAR SUPPORT PLATFORMS

(71) Applicant: SOLARISFLOAT, LDA, Matosinhos (PT)

(72) Inventors: Nuno Correia, Oporto (PT); Carla Gomes, Oporto (PT); Ricardo Pinto, Oporto (PT); Luis Pina, Oporto (PT); Nuno Moita, Oporto (PT); Jorge Teixeira Da Silva, Oporto (PT)

(73) Assignee: SOLARISFLOAT, LDA, Matosinhos (PT)

( * ) Notice: Subject to any disclaimer, the term of this patent is extended or adjusted under 35 U.S.C. 154(b) by 0 days.

(21) Appl. No.: 16/324,386

(22) PCT Filed: Sep. 1, 2017

(86) PCT No.: PCT/IB2017/055276
§ 371 (c)(1),
(2) Date: Feb. 8, 2019

(87) PCT Pub. No.: WO2018/055470
PCT Pub. Date: Mar. 29, 2018

(65) Prior Publication Data
US 2019/0222165 A1    Jul. 18, 2019

(30) Foreign Application Priority Data

Sep. 20, 2016 (PT) ........................................ 109625

(51) Int. Cl.
*F16M 13/00* (2006.01)
*H02S 20/30* (2014.01)
(Continued)

(52) U.S. Cl.
CPC .............. *H02S 20/30* (2014.12); *B63B 35/44* (2013.01); *B63B 2035/4453* (2013.01); *H02S 30/10* (2014.12)

(58) Field of Classification Search
CPC ......... H02S 20/30; H02S 30/10; B63B 35/44; B63B 2035/4453
(Continued)

(56) References Cited

U.S. PATENT DOCUMENTS

| | | | | |
|---|---|---|---|---|
| 10,480,828 B2 * | 11/2019 | Correia | .................. | B63B 35/38 |
| 2015/0162866 A1 * | 6/2015 | Yun | ........................ | H02S 20/00 |
| | | | | 114/264 |
| 2016/0087573 A1 * | 3/2016 | Yang | ........................ | B63B 3/02 |
| | | | | 136/251 |

FOREIGN PATENT DOCUMENTS

| | | |
|---|---|---|
| DE | 4140683 A1 | 6/1993 |
| DE | 19938244 A1 | 2/2001 |

(Continued)

OTHER PUBLICATIONS

International Search Report and Written Opinion for Corresponding International Application No. PCT/IB2017/055276 (10 Pages) (dated Dec. 6, 2017).

*Primary Examiner* — Todd M Epps
(74) *Attorney, Agent, or Firm* — Lucas & Mercanti, LLP (57) ABSTRACT

A set of connectors for modular support platforms is provided. The connectors are used to aggregate at least two support elements, forming a support platform which can be rearranged by adding new support elements and connectors. The set of connectors is used to form a modular support platform for a solar panel power plant, allowing its installation in water surfaces.

9 Claims, 6 Drawing Sheets

(51) Int. Cl.
*H02S 30/10* (2014.01)
*B63B 35/44* (2006.01)

(58) Field of Classification Search
USPC .......................... 248/558; 114/264; 136/251
See application file for complete search history.

(56) References Cited

FOREIGN PATENT DOCUMENTS

FR     2980562 A1   3/2013
MX    216007874 A   2/2017

* cited by examiner

CONNECTORS FOR MODULAR SUPPORT PLATFORMS

CROSS-REFERENCE TO RELATED APPLICATIONS

This application is a 371 of PCT/IB2017/055276, filed Sep. 1, 2017, which claims the benefit of Portuguese Patent Application No. 109625, filed Sep. 20, 2016.

TECHNICAL FIELD

The present application discloses a set of connectors for modular support platforms.

BACKGROUND ART

Currently solar power plants are installed onshore or on pre-existing support structures. These systems are rarely installed offshore in locations such as lagoons, lakes, ponds, dams, rivers and others. This is mainly due to the instability of the base, and due to the undulation that results from wind, boat passage, and water level changes which are all characteristic of these locations.

The document US 2016/0087573 describes a floating structure which consists of a central convergence box which serves as the center and base point, where two or more buoys are connected to create a cross structure, ultimately connected to a circular frame which acts as a stabilizer element for the entire structure. The system described uses a plurality of elements, rendering the integrity of the structure dependent on the final circular frame, such that if this component is damaged the whole structure becomes structurally instable.

The document MX2016007874 describes a floating structure which connects floatation devices directly to each other, using a complex system to connect such floaters. These floaters are solid, making their transportation very difficult from an economic and practical viewpoint. The system uses connectors which are part of the floater and use a complex connection system relying on connector pins. This complex connection system is impossible to replace without disassembling the entire structure if there is any damage to a component.

The document FR2980562 describes a structure which receives solar panels directly by means of a slot system; each panel is mounted on a structure composed by at least 4 elements, which act as a frame and simultaneously as the floating element of the structure, thus creating a rigid structure and transmitting any loads and stress directly to the panel. The connectors for the system rely on a pin system for connection between floating elements, focusing the loads on this component. It is obvious that, from a structural point of view, the solar panels are highly solicited, which can lead to premature damage.

SUMMARY

The present application describes a set of connectors comprising:
- A first connector element comprising four connection ports and a lateral reinforcement in between each two connection ports, wherein:
  - Each connection port is formed by a hole in the surface of the connector element, configured to position and fix a support element by means of a connection mechanism;
  - The lateral reinforcement comprises two connection holes in the proximity of each connection port it is linking, for fixation of the support element by means of a connection mechanism; and
- A second connector element made of the same material as first connector element comprising a reticulate surface and two connection ports, wherein each port is formed by a hole in the surface of the connector element, configured to position and fix a support element by means of a connection mechanism.

In one embodiment, the first connector element and second connector element are of a thermoplastic material.

In another embodiment, the first connector element has a cross shape. In another embodiment, the second connector element has a rectangular shape.

In another embodiment, the connection mechanism is of a screw and nut type.

It is also described a modular support platform comprising four support elements maximum, wherein said support elements are connected by the first connector element of a first embodiment.

In one embodiment, the modular support platform comprises at least two support platforms connected by the second connector element of the first embodiment.

In another embodiment, the modular support platform comprises at least one additional support element wherein said support element is connected to the support platform by means of the second connector element of the first embodiment.

In another embodiment, the modular support platform comprises two support elements, wherein said support elements are connected by the second connector element of the first embodiment.

General Description

The present application discloses a set of connectors for modular support platforms. Said connectors are used to aggregate at least two support elements, forming a support platform which can be rearranged by adding new support elements and connectors, according to the need.

Therefore, in order to form a support platform, able to cope with dynamic loads and stresses caused by its natural and/or artificial motion, two types of connector elements were developed: first connector element and second connector element. In fact, by using two structurally different connectors for the purpose of forming a support platform, the support elements can be connected according to a predefined logic, which favours the modularity of the support platform itself according to a specific implementation scenario.

The support elements can be connected to each other, in the following way: the first connector element is used to connect four support elements maximum, forming a support platform; the second connector element, in its preferred form, is used to connect two support platforms, but can be used to join only two support elements, forming a smaller support platform.

The first connector element can take a plurality of shapes as long as it is adapted to connect four support elements maximum, by means of a connection mechanism. In its preferred form, said connector element has a cross shape, as a result of a careful evaluation, being engineered to best comply and accommodate the dynamic loads of the payload attached, and calculated for the best relation between minimal material usage and strongest mechanical resistance. Due to its purpose and function a thermoplastic material was chosen for its mechanical properties, in order to ensure that all the support elements connected to him are at the same level. In order to ensure this purpose, the connector element has a lateral reinforcement in between two connection ports where a support element is attached.

Each connection port is formed by a hole in the surface of the connector element, design to perfectly fit and position the support element attached to it. The fixation of the support element is ensured by means of a connection mechanism applied either in the connection port or in the lateral reinforcements of the connector element. In fact, the lateral reinforcement comprises two connection holes associated to the two connection ports that it is linking, promoting the fixation of the respective support elements.

On the other hand, second connector element is made of the same material as the first connector element, but designed to be more flexible in order to absorb dynamic loads and stress, assuring these are not transmitted to the support platform formed by the first connector elements. The connector can take a plurality of shapes however, the design of the connector engineered by this solution, of a rectangular shape, is the one which presents the best mechanical properties for the present application. Due to its flexibility, this connector is configured to connect two support platforms or two support elements, by means of a connection mechanism. For that purpose, it has two holes in its surface representing its two connection ports. The use of the referred holes promotes the perfect fit and positioning of the support elements which are attached to it. This connector element has a reticulate surface favoring its mechanical properties, and serving as a secondary effect for adding roughness and an anti-slip surface.

The combined use of these two types of connectors, allows the possibility to form modular platform structures that are able to cope with the dynamic loads originated from the surrounding environment, assuring that they are not transmitted to the payload attached to the support platform and therefore eliminating the need of a bulky and rigid structure for attaching the payload to the support platforms.

The connection mechanism used to connect support elements either to the first connector elements or the second connector elements can be of a non-permanent type connection, since a permanent connection, like a welding type, would derogate its modular function. For this reason, the connection mechanism used in both connector is of a screw and nut type.

BRIEF DESCRIPTION OF DRAWINGS

For easier understanding of this application, figures are attached in the annex that represent example forms of implementation, which nevertheless are not intended to limit the technique disclosed herein.

FIG. 4: Schematic representation of a floating structure, where the reference numbers represent:
2—Support platform
4—Support element;
5—First connector element 1.

DESCRIPTION OF EMBODIMENTS

For easier understanding of this application, figures are attached in the annex that represent example forms of implementation which, nevertheless, are not intended to limit the technique disclosed herein.

In a particular embodiment, the set of connectors now developed is used to form a modular support platform for a solar panel power plants, allowing its installation in, but not exclusively, water surfaces. In this embodiment, and considering the scenario where the solar panel power plant is installed in a water surface, the support element is of a floating type.

Figure 1:
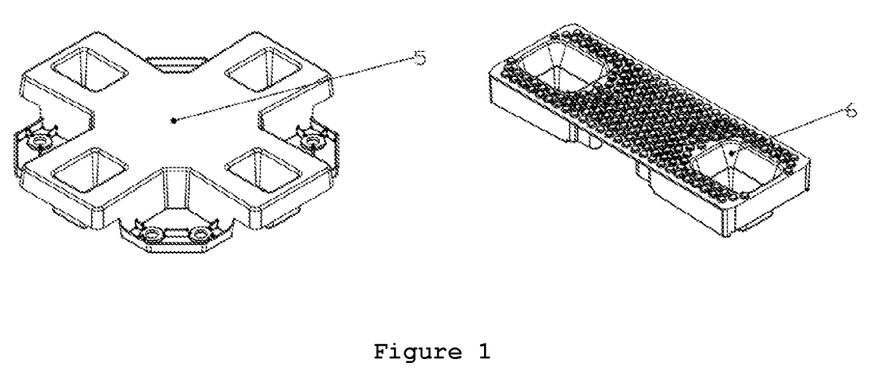
FIG. 1: Schematic representation of connector elements 1 and 2, where the reference numbers represent:
5—First connector element;
6—Second connector element.
Figure 2:
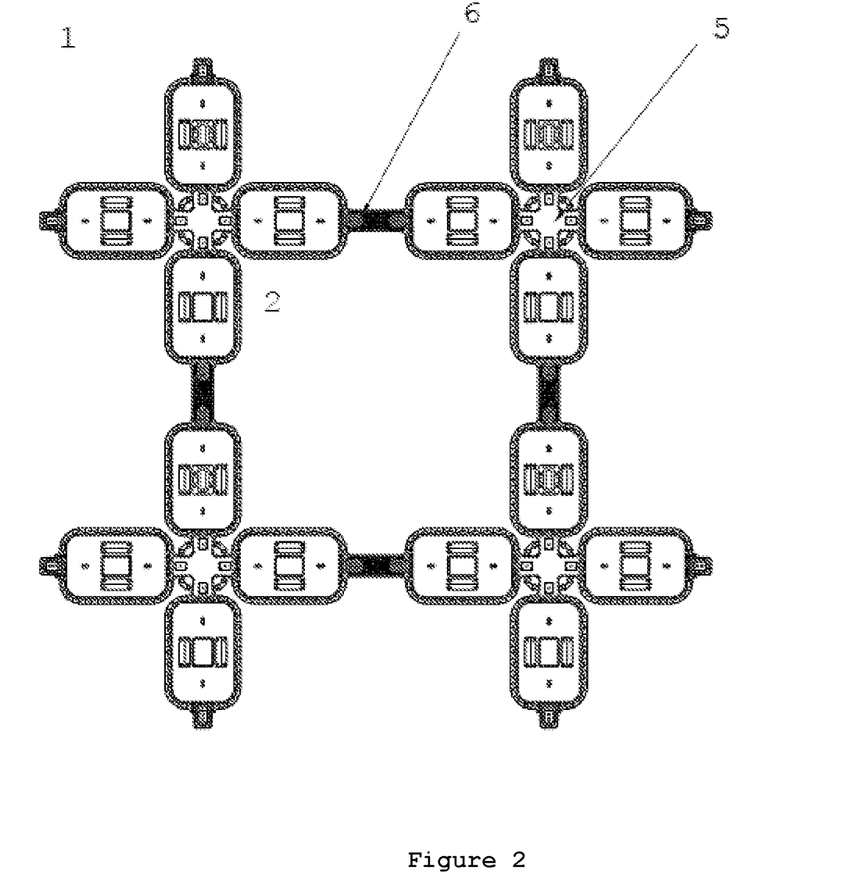
FIG. 2: Schematic representation of a modular platform, where the reference numbers represent:
1—Modular support platform;
2—Support platform;
5—First connector element;
6—Second connector element.
Figure 3:
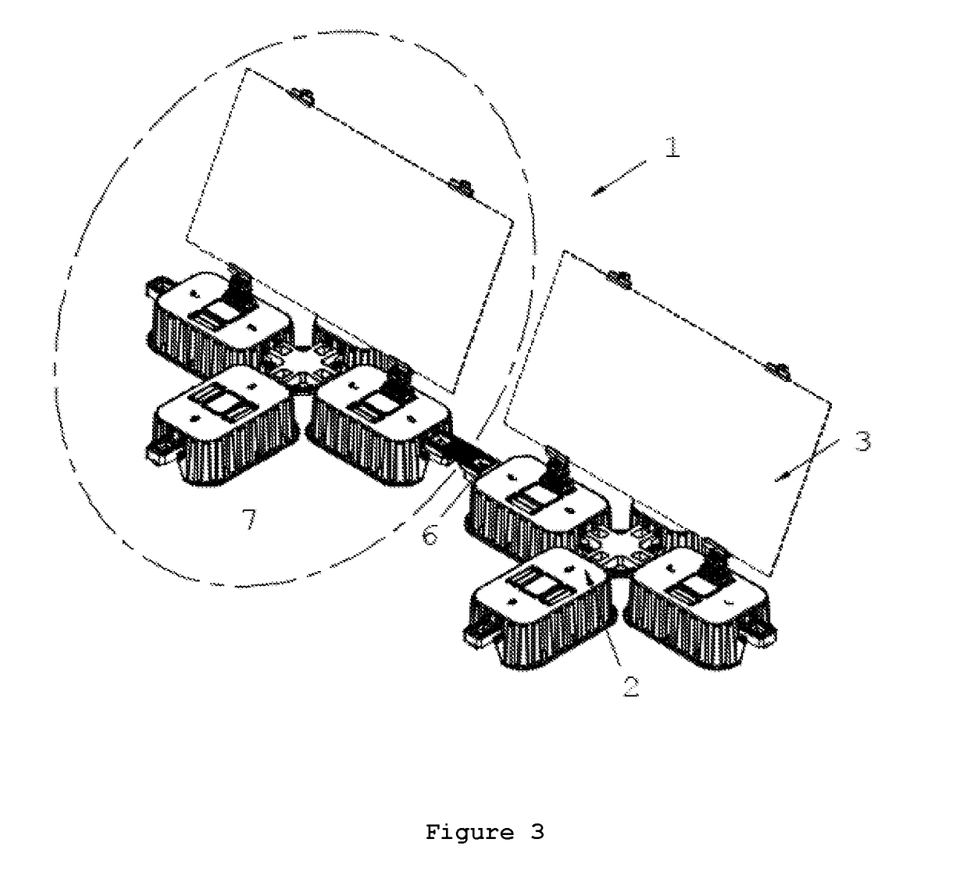
FIG. 3: Schematic representation of a modular platform, where the reference numbers represent:
1—Modular support platform;
2—Support platform;
3—Solar module;
6—Second connector element;
7—Support platform for solar module.
Figure 4:
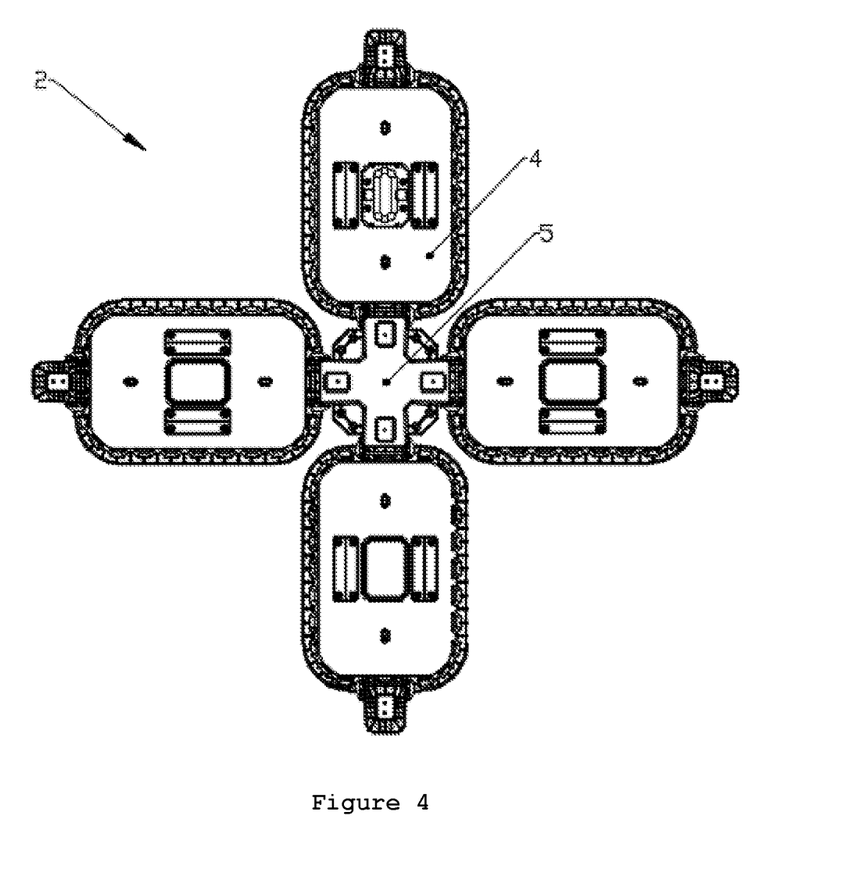
Figure 5:
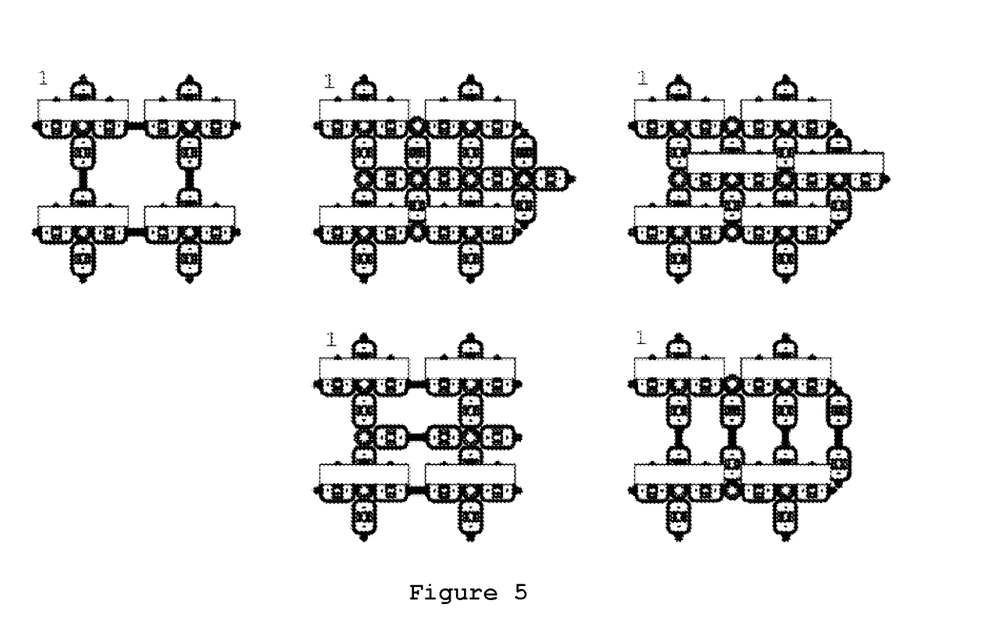
FIG. 5: Schematic showing several examples of combinations of modular support platforms (1).
Figure 6A:
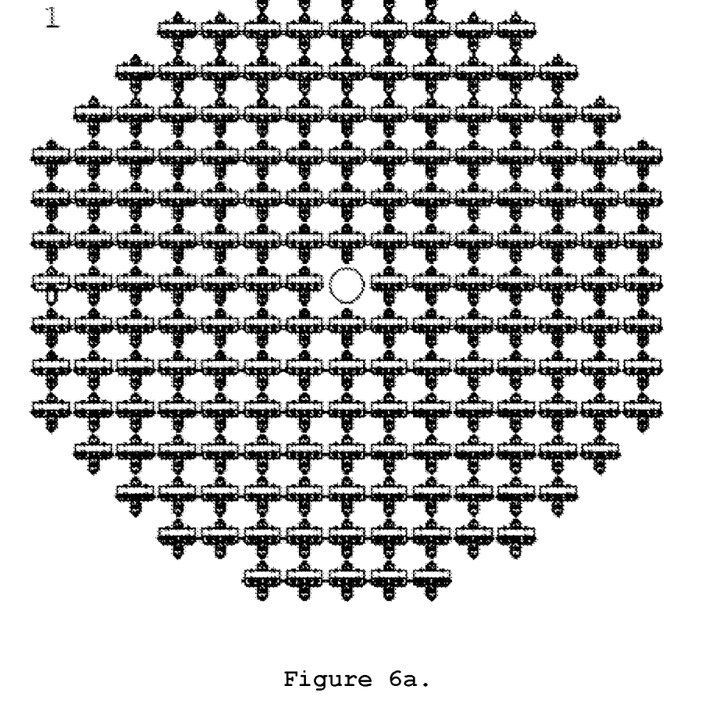
FIGS. 6a and 6b: Schematic showing several examples of configurations of modular support platforms (1) optimized for the location.
Figure 6B:
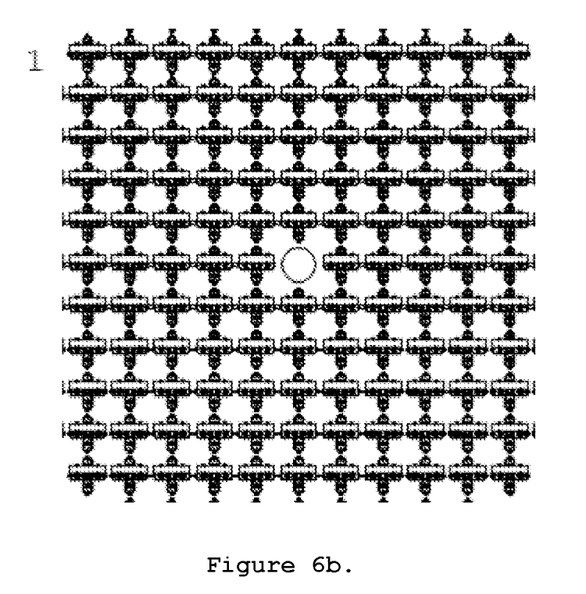

With the set of connectors now developed is possible to optimize the number and disposition of the flotation elements in order to maximize the number of solar panels in each location. In this context, a modular floating support platform (1) for solar modules can be formed by connecting at least two floating support platforms (7), having each one four floating support elements (4) wherein a solar module (3) is installed. In this configuration, the floating support elements (4) are connected amongst themselves by two different connector elements, first connector element (5) and second connector element (6), promoting an infinite number of combinations, hence the modular characteristic of this system which allows for optimization depending on the location attributes. In fact, the disposition of the floating platform is defined after studying the deployment site, always within a disposition based on an array of structures, as suggested by FIGS. 4 and 5.

The first connector element (5) is used to connect four floatation support elements (4) maximum, forming a floating support platform (2), whilst the second connector element (6) is applied when the connection between only two flotation support elements (4) or between two floating support platforms (2) is required.

The invention claimed is:
1. A set of connectors and support elements comprising:
a first connector element having a cross shape comprising
four first connection ports that connect up to four support elements to form a first support platform, and
four lateral reinforcements in between connection ports, wherein:
each of the four first connection ports further comprises a first hole configured to position and fix said support elements;
each of the lateral reinforcements comprises two connection holes in proximity to each of the four connection ports to link and fix the support elements; and
a second connector element comprising a reticulate surface having a rectangular shape and two second connection ports to connect one of the four support ele- ments that form the first support platform with an adjacent support element that form an adjacent support platform, wherein:

each of the second connection ports comprises a second hole configured to position and fix said one of the four support elements and the adjacent support element.

2. The set of connectors according to claim 1, wherein the first connector element and the second connector element are of a thermoplastic material.

3. The set of connectors according to claim 1, wherein each of the four connection ports further comprising the first hole on a surface of said first connector element is configured to position and fix said support elements by means of a screw and nut.

4. A modular support platform comprising a plurality of support platforms, each of the plurality of support platforms comprising four support elements connected to the first connector element according to claim 1.

5. The modular support platform according to claim 4, wherein at least two support platforms of the plurality of support platforms are connected by the second connector element.

6. The modular support platform according to claim 4, further comprising at least one additional support element connected to at least one of the support elements of the plurality of support platform by means of the second connector element.

7. The modular support platform according to claim 4, further comprising additional two support elements, wherein said additional support elements are connected to the support elements of the support platform by means of the second connector element.

8. The set of connectors according to claim 1, wherein each of the lateral reinforcements that comprises the two connection holes in proximity to each of the four connection ports link and fix the support elements by means of a screw and a nut.

9. The set of connectors according to claim 1, wherein each of the second connection ports comprising the second hole is configured to position and fix said one of the four support elements and the adjacent support element by means of a screw and a nut.

* * * * *